US006062868A

United States Patent [19]

Toriumi

[11] Patent Number: 6,062,868

[45] Date of Patent: May 16, 2000

[54] SING-ALONG DATA TRANSMITTING METHOD AND A SING-ALONG DATA TRANSMITTING/RECEIVING SYSTEM

[75] Inventor: Hiroshi Toriumi, Tokyo, Japan

[73] Assignee: Pioneer Electronic Corporation, Tokyo, Japan

[21] Appl. No.: 08/732,716

[22] Filed: Oct. 18, 1996

[30] Foreign Application Priority Data

Oct. 31, 1995 [JP] Japan .................................... 7-284011

[51] Int. Cl.[7] .............................. G09B 15/06; G10H 7/00

[52] U.S. Cl. ................................. 434/307 A; 434/307 R; 348/13; 84/609; 84/477 R; 340/825.07; 370/437

[58] Field of Search ................................ 434/307 R–309, 434/318, 118, 365; 84/477 R, 609–613, 634–637, 644, 650–652, 662; 369/1, 2, 4, 48, 178, 192; 360/32, 72.2; 348/473, 595, 563, 564, 484, 478, 7, 12–14, 732, 488, 571; 386/96; 379/93; 370/95.1, 95.2, 85.8, 432, 535, 536, 437; 340/825.03, 825.08, 825.21, 825.07; 705/39; 485/4.2, 5.1, 6.3; 704/769; 455/66, 5.1, 4.2, 6.3, 3.1; 375/358

[56] References Cited

U.S. PATENT DOCUMENTS

| | | | |
|---|---|---|---|
| 4,896,209 | 1/1990 | Matsuzaki et al. | 348/8 |
| 5,526,284 | 6/1996 | Mankovitz | 455/66 |
| 5,548,281 | 8/1996 | Funahashi et al. | 340/825.08 |
| 5,589,947 | 12/1996 | Sato et al. | 366/96 |
| 5,612,681 | 3/1997 | Funahashi et al. | 340/825.21 |
| 5,613,192 | 3/1997 | Ikami et al. | 455/4.2 |
| 5,619,425 | 4/1997 | Funahashi et al. | 434/307 A X |
| 5,663,515 | 9/1997 | Kato | 84/609 |
| 5,675,509 | 10/1997 | Ikami et al. | 370/563 |
| 5,684,843 | 11/1997 | Furukawa et al. | 375/358 |
| 5,691,494 | 11/1997 | Sai et al. | 434/307 A X |
| 5,691,915 | 11/1997 | Funahahsi et al. | 705/39 |
| 5,725,383 | 3/1998 | Funahashi et al. | 434/307 A |
| 5,774,672 | 6/1998 | Funahashi et al. | 340/825.08 X |
| 5,797,752 | 8/1998 | Umezawa | 434/307 A |
| 5,808,224 | 9/1998 | Kato | 84/609 |
| 5,810,603 | 9/1998 | Kato et al. | 434/307 A |
| 5,824,934 | 10/1998 | Tsurumi et al. | 434/307 A X |

*Primary Examiner*—Joe H. Cheng
*Attorney, Agent, or Firm*—Arent Fox Kinter Plotkin & Kahn PLLC

[57] ABSTRACT

A sing-along data transmitting method includes the steps of providing a sing-along data center for supplying background video data and music data, and providing a plurality of sing-along data receiving terminals for receiving the background video data and music data fed from the sing-along data center. The next step is transmitting a plurality of background video data by way of a plurality of different channels, and transmitting music data of a plurality of melodies by way of at least one channel. The method further includes the step of transmitting a channel data indicating a channel through which said background video data corresponding to a selected music is being transmitted, with the channel data being transmitted together with music data. There is also provided a sing-along data transmitting/receiving system for carrying out the above sing-along data transmitting method.

5 Claims, 8 Drawing Sheets

SING-ALONG DATA TRANSMITTING METHOD AND A SING-ALONG DATA TRANSMITTING/RECEIVING SYSTEM

BACKGROUND OF THE INVENTION

The present invention relates to a sing-along (so-called Karaoke) data transmitting method and a sing-along data transmitting/receiving system.

FIG. 6 shows a conventional sing-along data transmitting/receiving system, where a plurality of sing-along data receiving terminals 4 are provided so that they can communicate with a host 2 and/or a plurality of sub-hosts 3 by way of ISDN (integrated service digital network) and/or public telephone lines.

As shown in FIG. 6, each sing-along data receiving terminal 4 has a main section 10 including a communication interface (hereinafter referred to as I/F) 12, a controller 11 capable of operating for the main section 10 to receive sing-along music data through the I/F 12 and to store the data in a hard disc 13. The terminal 4 further has a speaker 8, a monitor 9, an audio player 5, either a background image video player 6 or a laser disc player 7, all of which are connected with the main section 10 on the outside thereof.

Referring to FIG. 6, the main section 10 further contains a music data decoder 14 and an audio signal generating circuit 15 which are provided to produce audio signal in accordance with the music data read from either the audio player 5 or the hard disc 13. The audio signal fed from the audio signal generating circuit 15 is applied to the speaker 8. Moreover, the main section 10 contains a character signal generating circuit 16 and a synthesizing circuit 17. In this way, character signals are generated and mixed with the background image data produced from the background image video player 6. Finally, the synthesized signals are applied to the monitor 9.

In the conventional sing-along data transmitting system shown in FIG. 6, a new melody producing section 1 is provided to compose new melodies. The newly composed melody data are fed to the host 2, and further fed through ISDN to the sub-hosts 3 and stored there. When there is a request for obtaining new melodies, the new melody data may be supplied from the sub-hosts 3 through public telephone lines to the I/F 12, and stored in the hard disc 13 by the control of the controller 11. In this way, newly composed melodies can be supplied to respective terminals 4.

When there is a request for a desired melody, such a request may be input to the sing-along data receiving terminal 4. If the melody data are stored in a disc of the audio player 5, the desired melody data may be read out therefrom. On the other hand, if the desired melody data are stored in the hard disc 13, it can be read out from the hard disc 13. In both cases, read-out melodies are reproduced through the speaker 8. Meanwhile, background image data corresponding to the selected melody may be read out from a disc of the background image video player 6, and the background image is then displayed on the monitor 9.

FIG. 7 shows another conventional sing-along data transmitting/receiving system using a CATV system. As illustrated in FIG. 7, the sing-along data transmitting/receiving system includes a CATV center 21 and a CATV terminal 22, which are connected with each other through a CATV cable 20.

The CATV center 21 contains a re-transmitting section 21*a* for re-transmitting television broadcast signals, laser disc players 21*b* for reproducing background images and corresponding melodies, modulation circuits 21*c* for modulating reproduced video and audio signal in a predetermined frequency band, a mixer 21*d* for mixing various signals and for transmitting the mixed signals through the CATV cable 20.

The CATV terminal 22 includes a converter 22*a* and a TV receiver 22*b*. Besides, it is also possible to include an audio stereo equipment to improve acoustic sound effect.

In the system shown in FIG. 7, if a sing-along shop (CATV terminal 22) has a request for a desired sing-along song, such a request may be transmitted by telephone to an operator of the CATV center 21. Then, the converter 22*a* of the CATV terminal 22 is operated to select a sing-along channel. After waiting for a while, the desired sing-along melody and image are reproduced in the CATV center 21 and are transmitted to the CATV terminal 22 through a selected sing-along channel by way of the CATV cable 20.

In order to eliminate the inconvenience of requesting a desired sing-along song by telephone, there has been suggested a further sing-along transmitting/receiving system using a two-way CATV system, as shown in FIG. 8. The system has a CATV terminal 24 including a converter 24*a*, a TV receiver 24*b* and a remote controller 24*c*. The converter 24*a* is used to transmit a signal requesting a desired sing-along song to the CATV center 23 by way of an up-stream channel of the CATV cable 20. Then, a controller 23*e* operates to control a laser disc player 23*b* so as to reproduce the desired melody and image. The reproduced data representing the desired song are transmitted to the terminal 24 through the CATV cable 20.

However, the above conventional sing-along systems have the following disadvantages.

In the system shown in FIG. 6, each sing-along data receiving terminal 4 is required to include an audio data player 5 and a video data player 6. In detail, it is necessary to employ an audio player having a disc changer capable of receiving many audio discs containing the data of at least 10000 melodies. Further, it is also necessary to employ a video player having a disc changer capable of receiving many video discs containing the data of at least 80 patterns of background images. As a result, a sing-along shop has a high burden in equipment investment and daily management.

In the systems using CATV as shown in FIGS. 7 and 8, since there are only limited number of channels for data transmitting, it is merely allowed to have at most 10 terminals (22 or 24) for independently performing sing-along service at the same time. In particular, in the evening of a weekend when there are many customers for sing-along playing, it is often required to stop television retransmitting service in order to ensure sufficient sing-along services.

SUMMARY OF THE INVENTION

It is an object of the present invention to provide an improved sing-along data transmitting method and an improved sing-along data transmitting/receiving system, so as to solve the above-mentioned problems peculiar to the above-mentioned prior arts.

According to one aspect of the present invention, there is provided a sing-along data transmitting method which comprises: providing a sing-along data center for supplying background video data and music data; providing a plurality of sing-along data receiving terminals for receiving the background video data and music data fed from the sing-along data center; transmitting a plurality of background video data by way of a plurality of different channels; and transmitting music data of a plurality of melodies by way of at least one channel.

The method further includes transmitting a channel data indicating a channel through which said background video data corresponding to a selected music is being transmitted, said channel data being transmitted together with the selected music data. Here, said music data contain music melody data and lyrics data, and are repeatedly transmitted. Further, such music data are compressed so as to be transmitted in a sufficiently shortened time period less than real time.

According to another aspect of the present invention, there is also provided a sing-along data transmitting/receiving system for carrying out the above sing-along data transmitting method.

The sing-along data transmitting/receiving system comprises: a sing-along data center for supplying background video data and music data; a plurality of sing-along data receiving terminals for receiving the background video data and music data fed from the sing-along data center; a data communication way for transmitting the background video data and music data from the sing-along data center to the plurality of sing-along data receiving terminals.

The sing-along data center comprises: a video data supplying means for repeatedly reproducing a plurality of background video data; a video data transmitting means for transmitting the reproduced background video data by way of respective video data transmitting channels; a music data supplying means for repeatedly reproducing music data of a plurality of melodies; a music data transmitting means for transmitting the reproduced music data by way of a predetermined music data transmitting channel.

Each of the sing-along data receiving terminals comprises: an input means for designating a sing-along melody; a music data receiving means for receiving the music data from the above predetermined music data transmitting channel; and a video data receiving means for receiving the video data from one of the above video dada transmitting channels.

The sing-along data transmitting/receiving system according to the present invention, further comprises a channel data producing means for producing a channel data indicating a channel through which a background video data corresponding to a music is being transmitted. In particular, the music data transmitting means is provided to transmit reproduced music data together with the produced respective channel data, and the music data receiving means is provided to extract music data of a sing-along melody designated by said input means and to extract channel data corresponding to the designated sing-along melody. Further, the video data receiving means receives the video data from one of the video data transmitting channels, in accordance with the extracted channel data.

According a further aspect of the present invention, there is provided a sing-along data receiving system, adapted to receive background video data transmitted through a plurality of video data transmitting channels, to receive music data of a plurality of melodies by way of at least one music data transmitting channel, to receive a channel data indicating a channel through which said background video data corresponding to a selected music is being transmitted.

Said sing-along data receiving terminal comprises: an input means for designating a sing-along melody; a music data receiving means for selecting a music data transmitting channel to receive music data of a sing-along melody designated by the input means and channel data corresponding to the sing-along melody, so as to output the sing-along melody; and a video data receiving means for selecting one of the video data transmitting channels in accordance with channel data received by the above music data receiving means, so as to receive the background video data, thereby outputting the background image.

The above objects and features of the present invention will become more understood from the following description with reference to the accompanying drawings.

BRIEF DESCRIPTIONON OF DRAWINGS

DETAILED DESCRIPTION OF THE PREFERRED EMBODIMENTS

Figure 1:
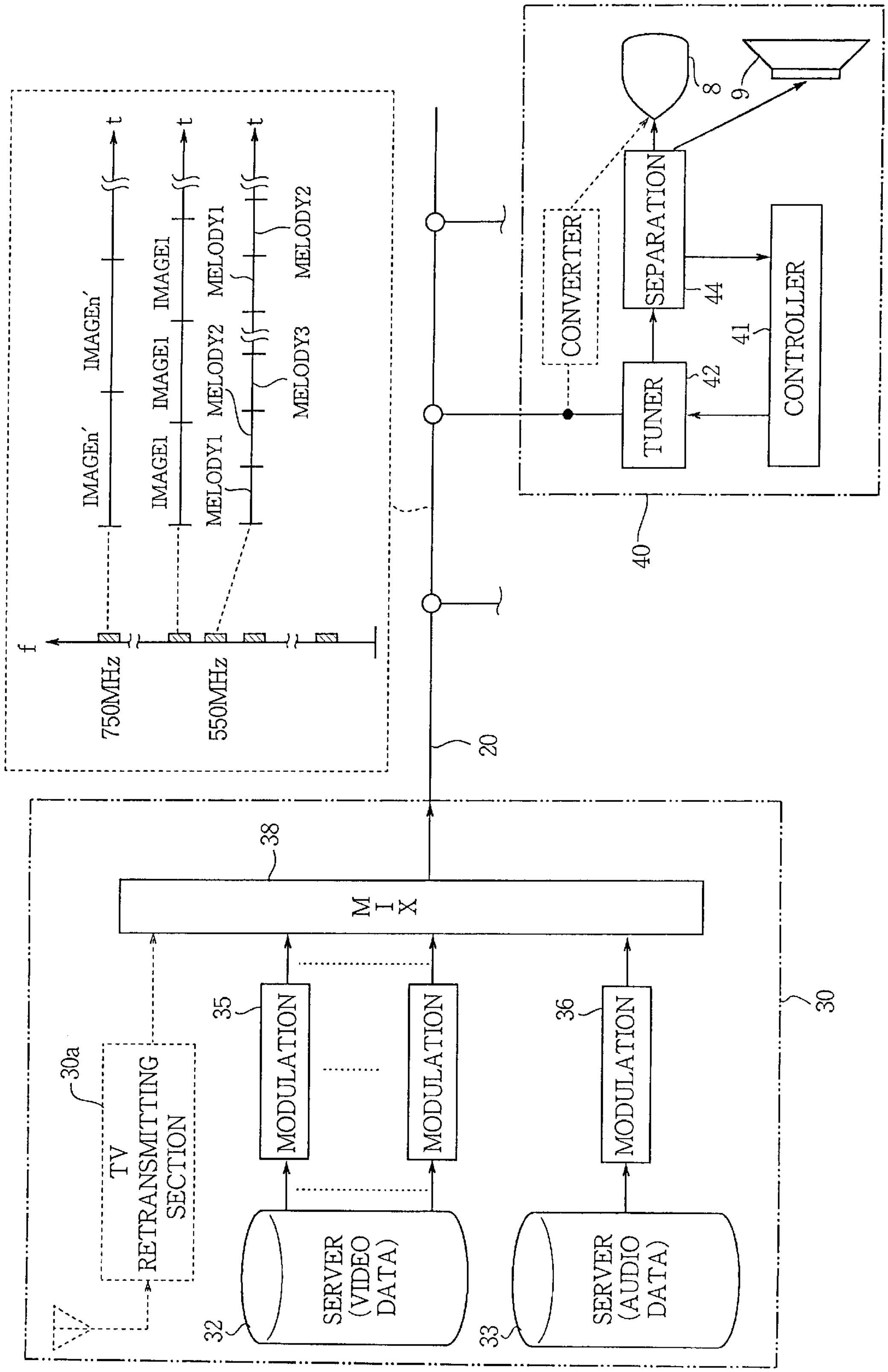
FIG. 1 is a block diagram showing a preferred embodiment of a sing-along data transmitting/receiving system according to the present invention.

Referring to FIG. 1, a sing-along data transmitting/receiving system of the present invention includes a sing-along data center 30 (hereinafter, simply referred to as center) for supplying and transmitting sing-along data, a plurality of sing-along data receiving terminals 40 (hereinafter, simply referred to as terminals), a CATV cable 20 for communication between the center 30 and the terminals 40.

The center 30 includes a TV retransmitting section 30*a* for receiving and transmitting TV signal and performing two-way data communication, all using a frequency band below 550 MHz. The terminal 40 is connected to the CATV cable 20 in a manner similar to a conventional CATV terminal. Sing-along data (image and melody) are transmitted from the center 30 through the CATV cable 20 to the terminals 40 using a frequency band of 750 MHz–550 MHz.

Figure 2:
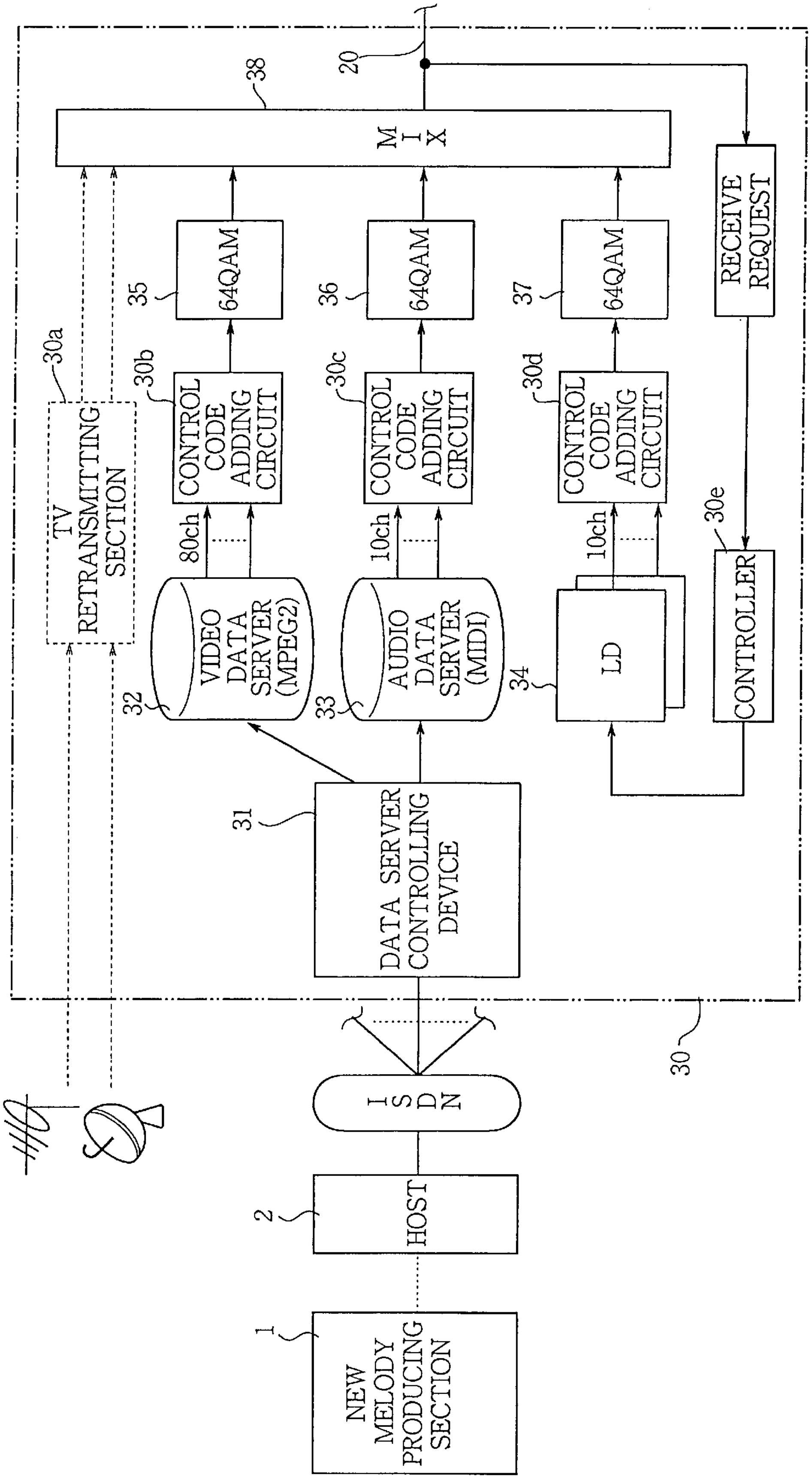
FIG. 2 is a block diagram indicating a sing-along data center involved in the system of FIG. 1.

Referring to FIG. 2, the center 30 has a data server controlling device 31 including a micro-computer and an I/F (interface) connecting with ISDN (integrated service digital network) circuit, and a video data server 32 which is under control of the controlling device 31 for storing and transmitting background image video data. There are 80 patterns of background images which are classified in accordance with their specific properties and stored in a form of digital data. Since the background video data are compressed in accordance with a MPEG (moving picture coding experts group)-2 method, the memory capacity of the video data server 32 and the transmitting capacity of the CATV cable 20 are allowed to be comparatively small.

The video data server 32 includes a storage memory such as hard disc, a read-out circuit and a controller for controlling the hard disc and the read-out circuit. Such a video data server 32 may be used to continuously read out the 80 patterns of background video data and to feed the same to a control code adding circuit 30*b*. The control code adding circuit 30*b* is provided to add a control code in the background video data so as to identify the data.

Then, an AM modulation circuit 35 is provided after the control code adding circuit 30*b* for modulating 80 patterns (80 channels) of background video data in accordance with a 64QAM (quadrature amplitude modulation) method. In this way, it becomes possible to transmit video data having a data amount corresponding to four channels, using only one channel having a frequency band of 6 MHz, which in prior art can only be used to transmit analogue data of one channel. Thus, the background video data of 80 channels, which have been frequency-multiplxed and converted into signals in a frequency band of 625 MHz–750 MHz, are transmitted through a mixer 38 to the CATV cable 20.

Referring again to FIG. 2, the center 30 is further provided with an audio data server 33 which is also controlled by the data server controlling device 31 so as to store and transmit digital audio data. Such digital audio data include 10000–20000 melodies, of which musical instrument melody data have been compressed in accordance with MIDI (musical instrument digital interface) standard and back-chorus melody data have been compressed in accordance with MPEG method. Therefore, the memory capacity of the audio data server 33 and the transmitting capacity of the CATV cable 20 are allowed to be comparatively small.

In this embodiment according to the present invention, when a music data is being stored in the audio data server 33, the data server controlling device 31 produces a channel data containing a channel number representing a channel through which a desired background video data is being transmitted. For instance, after a melody is selected, and a background image corresponding to the melody is transmitted through channel 3, the data server controlling device 31 will produce a channel data containing a channel number (channel 3). Such a channel data will be added at the beginning of the melody data.

Similarly, the audio data server 33 includes a storage memory such as a hard disc, a read-out circuit and a controller for controlling the hard disc and the read-out circuit. The music audio data containing 10000–20000 melodies are divided in the audio data server 33 into ten groups and will be read out continuously from the hard disc so as to be fed to a control code adding circuit 30*c*. Similarly, the control code adding circuit 30*c* is provided to add a control code in the music data so as to identify the data.

Then, a similar AM modulation circuit 36 is provided after the control code adding circuit 30*b* for modulating 10 groups (10 channels) of melody audio data in accordance with a 64QAM (quadrature amplitude modulation) method. In this way, the melody audio data of 10 channels, which have been frequency-multiplxed and converted into signals in a frequency band of 565 MHz–625 MHz, are transmitted through a mixer 38 to the CATV cable 20.

Referring further to FIG. 2, the center 30 has a controller 30*e*, a laser disc player 34, a further control code adding circuit 30*d* and a further AM modulation circuit 37. The controller 30*e* is provided to receive a request from a terminal 40 for a melody not stored in the audio data server 33. The laser disc player 34 is provided to reproduce a requested melody and corresponding image recorded on a laser disc (in the player 34) in accordance with a command from the controller 30*e*. The control code adding circuit 30*d* and the AM modulation circuit 37 are respectively similar to the control code adding circuit 30*c* and the AM modulation circuit 36.

The data server controlling device 31 of the center 30, is provided not only to perform the operations described above, but also to receive data of new melodies composed in a new melody producing section 1. The data of new melodies are transmitted from a host 2 through the ISDN (integrated service digital network). In fact, the data server controlling device 31 is so provided that as soon as data of a new melody is received, a channel data will be added in the received melody data which will then be stored in one group of melody data having least data amount as compared with other nine groups of melody data in the audio data server 33.

Figure 3:
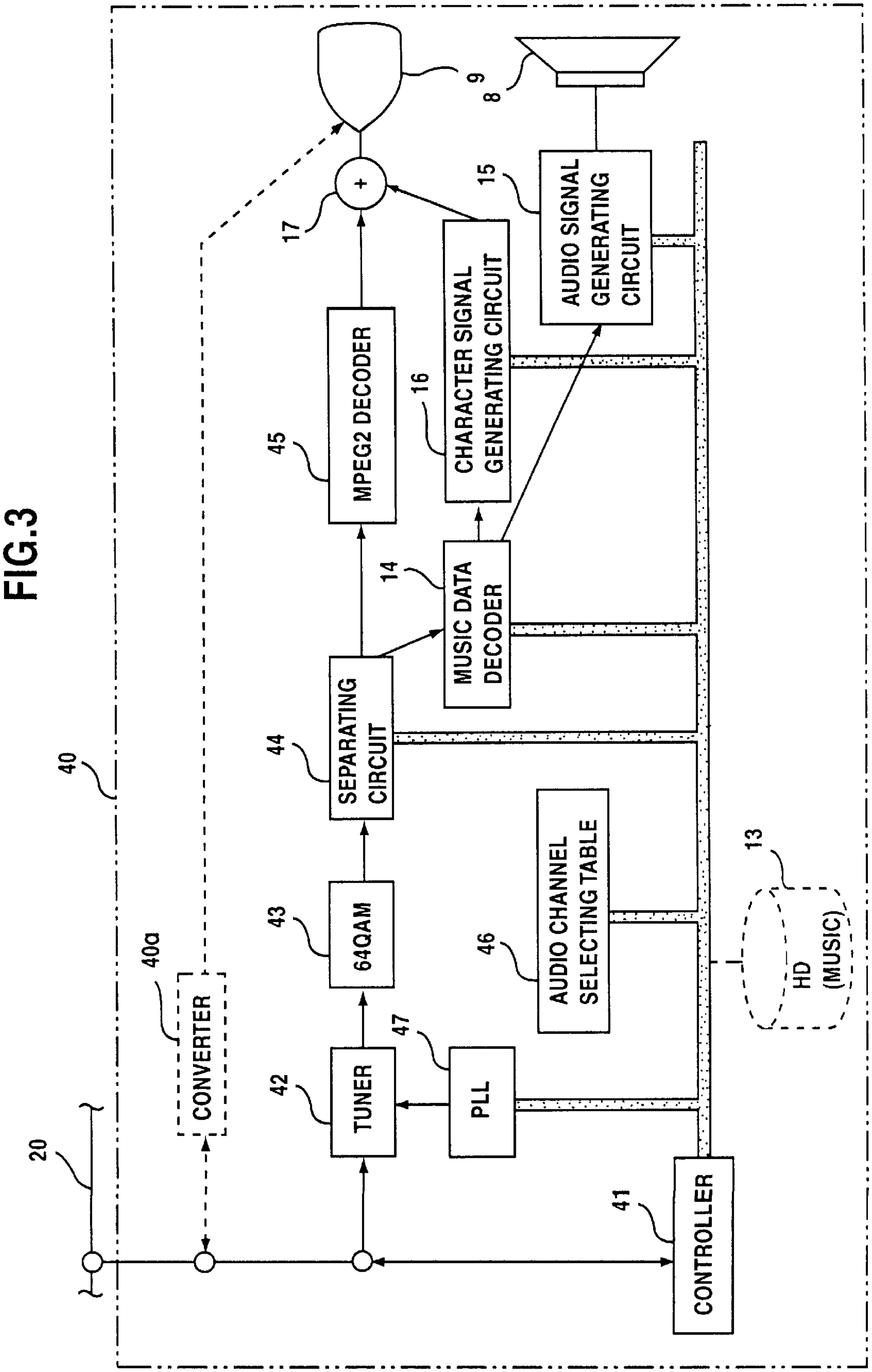
FIG. 3 is a block diagram indicating a sing-along data receiving terminal involved in the system of FIG. 1.

Referring to FIG. 3, the terminal 40 includes a converter 40*a* connected with the CATV cable 20 for receiving TV signals retransmitted from the center 30 and for two-way communication using a frequency band below 550 MHz. Similar to a conventional sing-along data transmitting/receiving system, the terminal 40 also has a speaker 8, a monitor 9, a hard disc 13, an music data decoder 14, an audio signal generating circuit 15, a character signal generating circuit 16 and a synthesizing circuit 17. Further, the terminal 40 includes a controller 41, a tuner 42, 64QAM demodulation circuit 43, a separating circuit 44, a MPEG2 decoder 45, an audio channel selecting table 46, and a PLL (phase locked loop) circuit 47.

Since it is possible to dispense with an audio player 5, a background image data player 6 and a laser disc player 7, the terminal 40 may be made more compact in size and lower in cost.

The controller 41 mainly contains a micro-computer to control the PLL circuit 47 and the music data decoder 14 in accordance with a predetermined program. The controller further includes a circuit for receiving data from the center 30 and another circuit for sending a data (such as a request signal) to the center 30.

Moreover, the controller 41 is provided with a commander and a data receiving circuit for specific use with the commander. Accordingly, a customer may perform remote operation using the commander to input a number of his desired melody, so that the number data of desired melody may be stored in an inner memory provided in the controller 41. In this way, it is possible to send a customer's request from the terminal 40 to the center 30, so as to select and reserve a desired melody by operating the controller 41 in the terminal 40.

The tuner 42 is connected with the CATV cable 20, and is adapted to selectively perform tuning within a range of 550 MHz–750 MHz in accordance with an oscillating signal from the PLL circuit 47.

The 64QAM demodulation circuit 43 is a signal processing circuit for processing received signals selected by the tuner 42 in accordance with the QAM method, so as to restore sing-along data transmitted from a predetermined channel.

The separating circuit 44 mainly contains a DSP (digital signal processor), and is capable of identifying whether a sing-along data being transferred herein is a background video data or a music data, with reference to a control code added therein. If a sing-along data is a background video data, the data will be fed to MPEG2 decoder 45. On the other hand, if a sing-along data is music (song) data, the data will be processed so as to separate channel data therefrom. The separated data and remaining data will be in a condition under control by the controller 41.

The audio channel selecting table 46 is a table provided on a memory such as a ROM (read-only memory), in which all the melody numbers including uppermost and lowermost numbers have been recorded. With reference to these numbers, it is possible to know a channel number indicating a channel for transmitting the desired melody.

Further, the controller 41, by referring to the audio channel selecting table 46, will obtain a channel number for a desired melody, so as to control the PLL circuit 47 in order that the tuner 42 will tune to a corresponding frequency band to select an appropriate channel.

In addition, the controller 41 is provided also to monitor the music (song) data passing through the separating circuit 44. When it is determined that a melody number contained in the music data is the same as a melody number of a requested melody, the separating circuit 44 will be controlled so that the music data will be fed to the music data decoder 14 which has a maintainable buffer for maintaining at least one piece of melody. Meanwhile, the controller 41 operates to control the PLL circuit 47 in order that the tuner 42 will tune to a frequency band corresponding to a channel (indicated by a channel data) for a desired background image, in accordance with the channel data separated from the music data in the separating circuit 44.

Furthermore, the controller 41 is provided such that, after music data have been fed from the separating circuit 44 to the music data decoder 14, it will control the music data decoder 14 (mainly containing the DSP), the audio signal generating circuit 15 (mainly containing MIDI audio source and DSP), the character signal generating circuit 16 (mainly containing character generator). Accordingly, character information of the music data is fed from the music data decoder 14 to the character signal generating circuit 16 so as to produce character signal. Meanwhile, musical instrument performance data and chorus data are decoded in accordance with a corresponding standard, thereby producing an analogue audio signal from these decoded data by means of the audio signal generating circuit 15. In this manner, the character signal is added to the background video data in the synthesizing circuit 17, whilst the audio signal is fed to the speaker 8.

The MPEG2 decoder 45, consisting of a DSP and a frame memory etc., receives video data from the separating circuit 44 so as to perform expanding process on the video data in accordance with MPEG-2 method. The background video signals restored through the expanding process are converted into analogue video signals, and finally fed to the monitor 9 through the synthesizing circuit 17.

Referring again to FIG. 3, the hard disc 13 is also adapted to receive newly added and/or renewed data, in particular to store or maintain audio data of 1000 melodies requested by customers. When a melody stored in the hard disc 13 is requested by a customer, the controller 41, by using the music data of the hard disc 13, can immediately effect a desired tuning to a background video data transmitting channel. In this way, the terminal 40 can perform a quick sing-along service by providing a melody newly requested by a customer.

Figure 4:
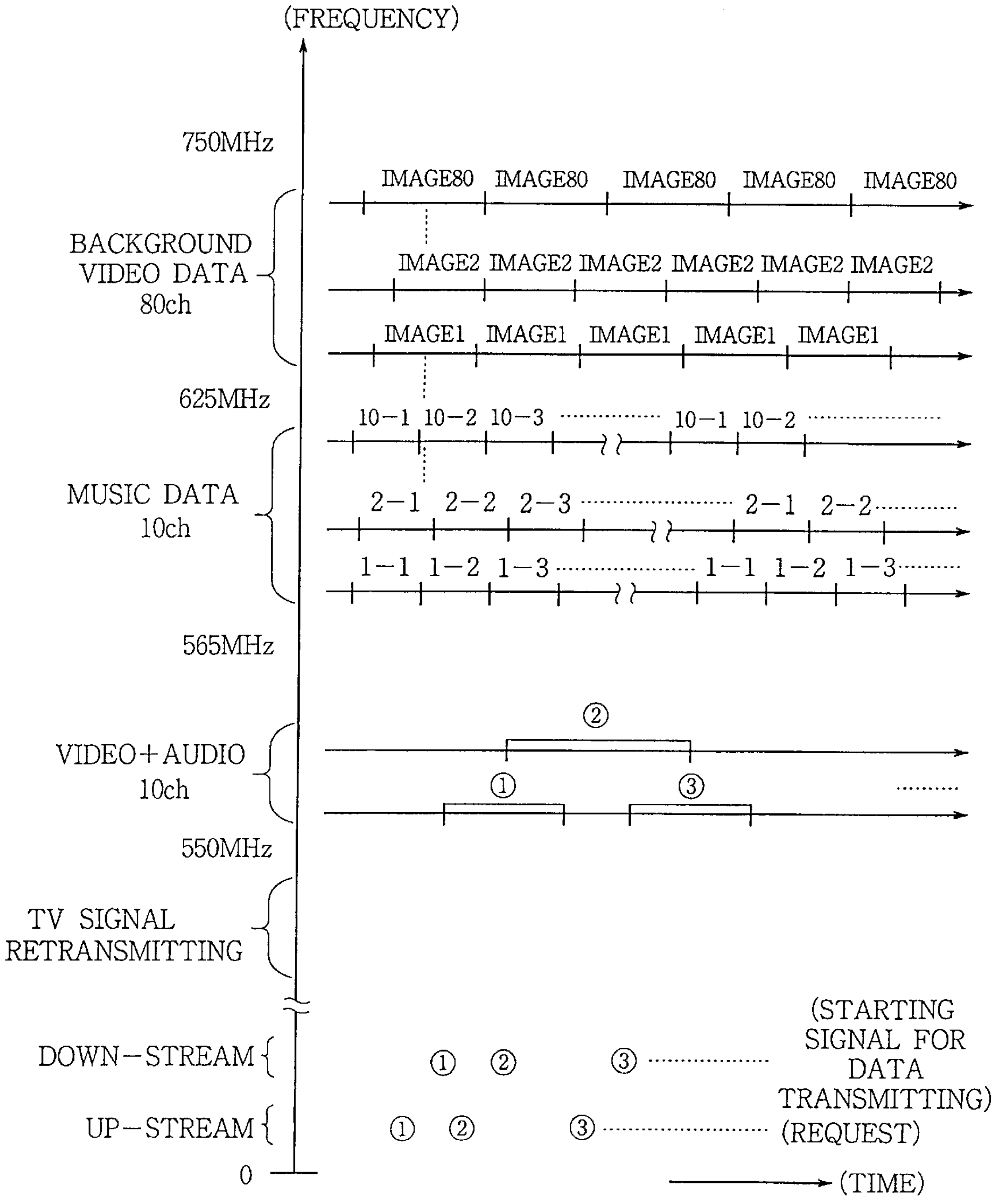
FIG. 4 is a graphical diagram indicating an assignment of frequency bands for transmitting various signals.

The operation of the above sing-along data transmitting/receiving system, which is the first embodiment of the present invention, will be described in detail below with reference to FIGS. 1–3, and further with reference to FIG. 4 showing various channels carried by the CATV cable 20 and an example of data flow therethrough.

Referring to FIGS. 1 and 4, at first, the background video data of 80 channels are transmitted with the use of a frequency band of 625 MHz–750 MHz (FIG. 4), by way of the data server controlling device 31, the video data server 32, the control code adding circuit 30*b*, the 64QAM modulation circuit 35 and the mixer 38. Thus, there have been established a plurality of channels for transmitting background video data. Therefore, a plurality of background video data, corresponding to a plurality of sing-along melodies, may be simultaneously, repeatedly and continuously transmitted through respective channels. For instance, one background image (image 1) is being transmitted by way of background image data transmitting channel 1, at the same time, another background image (image 2) is being transmitted by way of background image data transmitting channel 2.

Further referring to FIGS. 1 and 4, the melody data of 10 channels including 10000–20000 melodies divided into 10 groups each containing 1000–2000 of melodies, are transmitted with the use of a frequency band of 565 MHz–625 MHz (FIG. 4), by way of the data server controlling device 31, audio data server 32, the control code adding circuit 30*c*, the 64QAM modulation circuit 37 and the mixer 38. Thus, there have been established a plurality of channels for transmitting music audio data. Therefore, a plurality of audio melody data, corresponding to a plurality of sing-along melodies, may be simultaneously, repeatedly and continuously transmitted through respective audio data transmitting channels. Meanwhile, channel data are continuously transmitted together with respective audio melody data in united form therewith. For instance, melodies 1-1, 1-2, 1-3, . . . of the first group (containing 1000–2000 melodies) are being successively and continuously transmitted by way of audio data transmitting channel 1. At the same time, melodies 2-1, 2-2, 2-3, . . . of the second group (containing 1000–2000 melodies) are being successively and continuously transmitted by way of audio data transmitting channel 2.

In the center 30, all the channels for transmitting sing-along data are set above a frequency of 550 MHz, a plurality of background video data are transmitted through different channels, whilst a plurality of audio melody data together with channel data are transmitted through at least one channel. Thus, the sing-along service can be smoothly provided without causing any troubles (interference) to usual CATV service.

Referring again to FIG. 4, a frequency band of 550 MHz–565 MHz is reserved in order that the reproduced data from the laser disc player 34 (FIG. 2) may be transmitted, using such a frequency band which can form another 10 channels.

In the terminal 40, when a customer designates his desired melodies (for example, melody 1-1 and melody 1-2), it is checked whether his desired melodies have been stored in the hard disc 13. If a desired melody data is existing in the hard disc 13, the melody data will be fed to the music data decoder 14 so that a desired sing-along performance can be started immediately.

If a desired melody is not existing in the hard disc 13, the controller 41 makes an access to the audio channel selecting table 46, so that the channel number (for example, channel 1) of an audio data channel for transmitting a selected melody data may be known in accordance with a melody number (for example, melody 1-1). Then, with the PLL circuit 47 being controlled by the controller 41, the music data being transmitted through channel 1 can be received and monitorred by means of the tuner 42, 64QAM modulation circuit 43 and the separating circuit 44. In this way, the music data of melody 1-1 and channel data can be obtained within 10–20 seconds.

In fact, the music data are fed to the music data decoder 14, whilst the channel data are fed to the controller 41. Thus, the controller 41 operates to control the PLL circuit 47 in accordance with the channel data. Therefore, the desired background video data being transmitted through the background video data transmitting channel are fed to the MPEG2 decoder 45. For example, if the channel data indicates that channel 80 is a channel transmitting the desired background video data, the background video data of channel 80 will be applied to the MPEG2 decoder 45.

Thus, while background image (for example, image 80) is combined with the character data in the synthesizing circuit 17 and then displayed on the monitor 9, the sound of melody 1-1 is produced through the audio signal generating circuit 15 and the speaker 8.

Up to this, a sing-along service producing melody 1-1 can be provided to a customer in the terminal 40.

During the sing-along playing of melody 1-1, the controller 41 will continue to control the PLL circuit 47 and the separating circuit 44, so that the music data of another melody (for example, melody 2-2) and the channel data thereof may be obtained in the same manner with relation to melody 1-1. The music data of melody 2-2 and the channel data thereof are temporarily stopped and stored in the separating circuit 44. Then, as fast as the playing of melody 1-1 is over, the music data of melody 2-2 and channel data thereof are fed to music data decoder 14, so as to select a channel transmitting the background image data corresponding to melody 2-2. In this manner, it is possible to provide a customer with his desired melody (melody 2-2) and the corresponding background image in a shortest time period.

On the other hand, if 80 patterns of background image are found to be insufficient, a request may be fed from the terminal 40 through the up-stream channel to the center 30. Then, the laser disc player 34 reproduces a background video data and music data to be transmitted through a frequency band of 550 MHz–565 MHz (FIG. 4). Therefore, the requested and reproduced data may be transmitted from the center 30 to the terminal 40. However, at the beginning of the data transmitting, starting signals containing channel nember information are at first transmitted out through the downstream channel.

Figure 5:
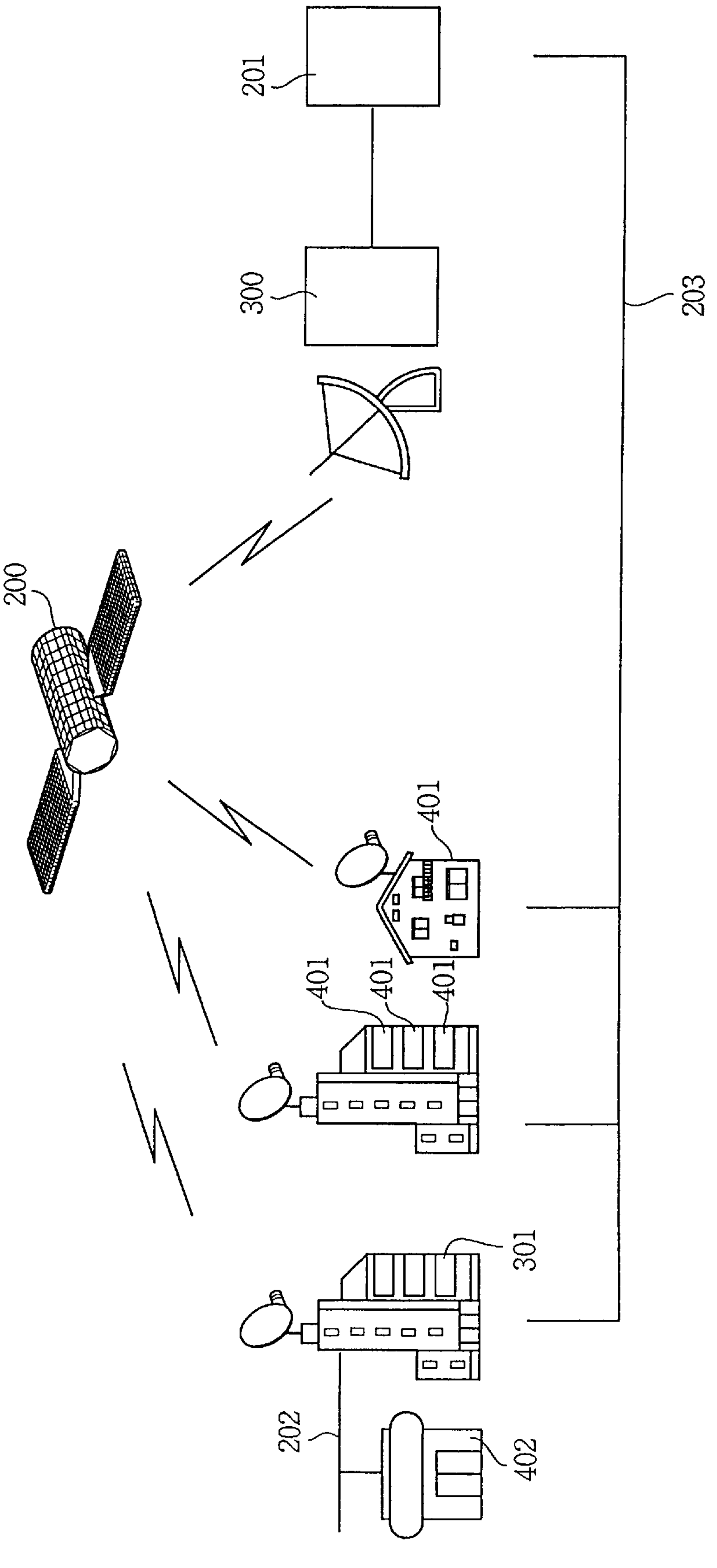
FIG. 5 is an explanatory view illustrating another embodiment of a sing-along data transmitting/receiving system according to the present invention.
Figure 6:
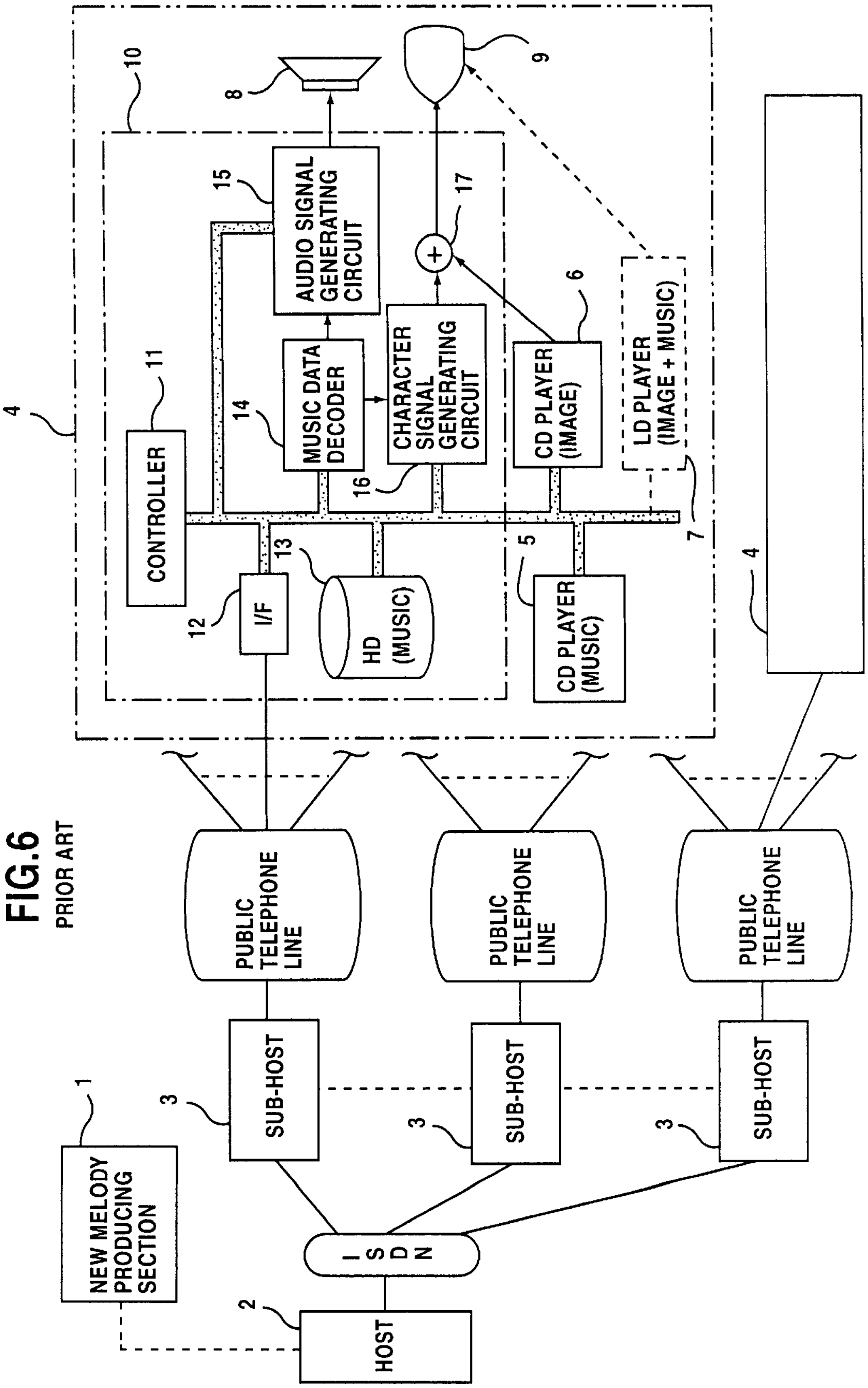
FIG.6 PRIOR ART
FIG. 6 is a block diagram showing a conventional sing-along data transmitting/receiving system.
Figure 7:
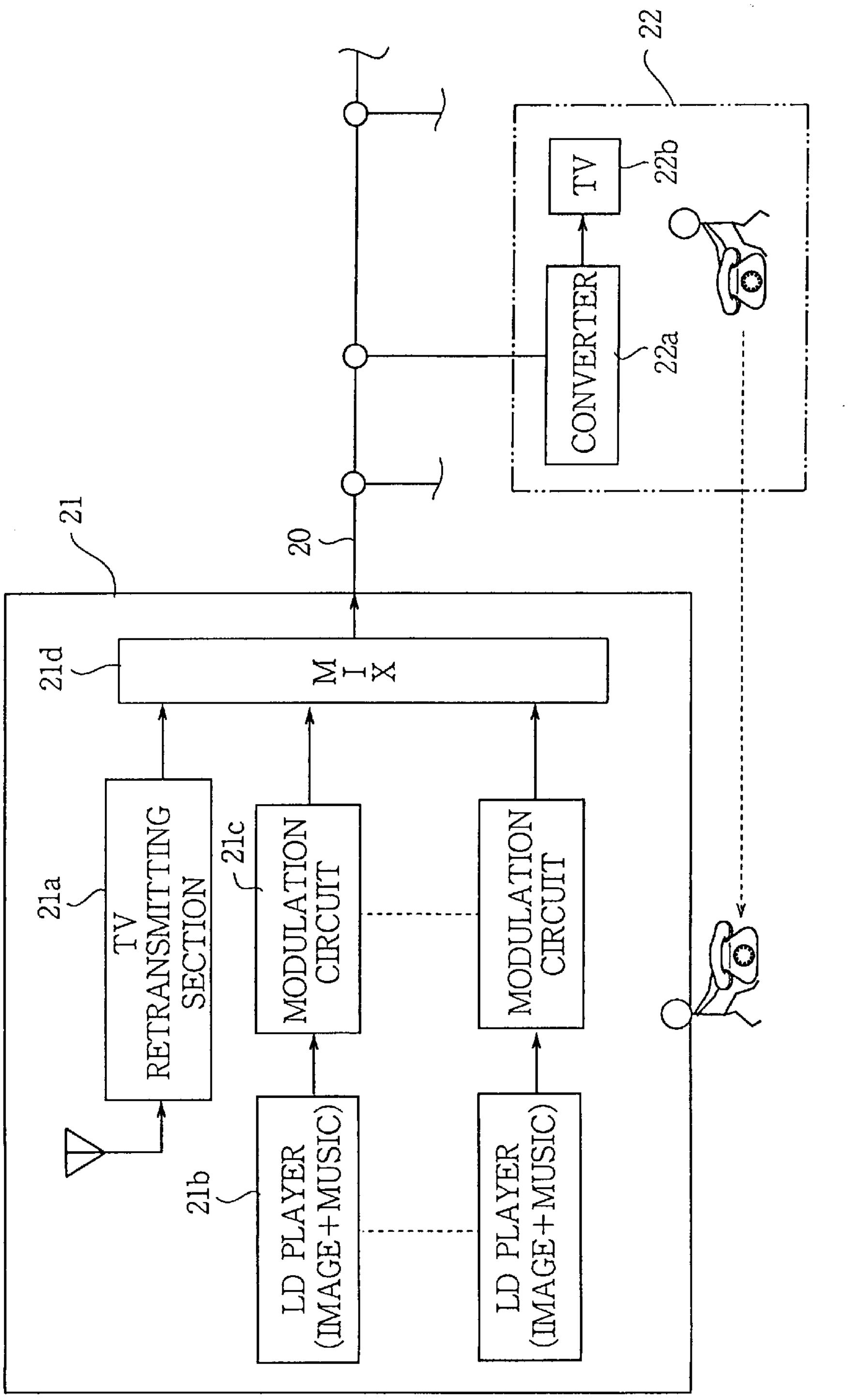
FIG.7 PRIOR ART
FIG. 7 is a block diagram showing another conventional sing-along data transmitting/receiving system using a CATV system.
Figure 8:
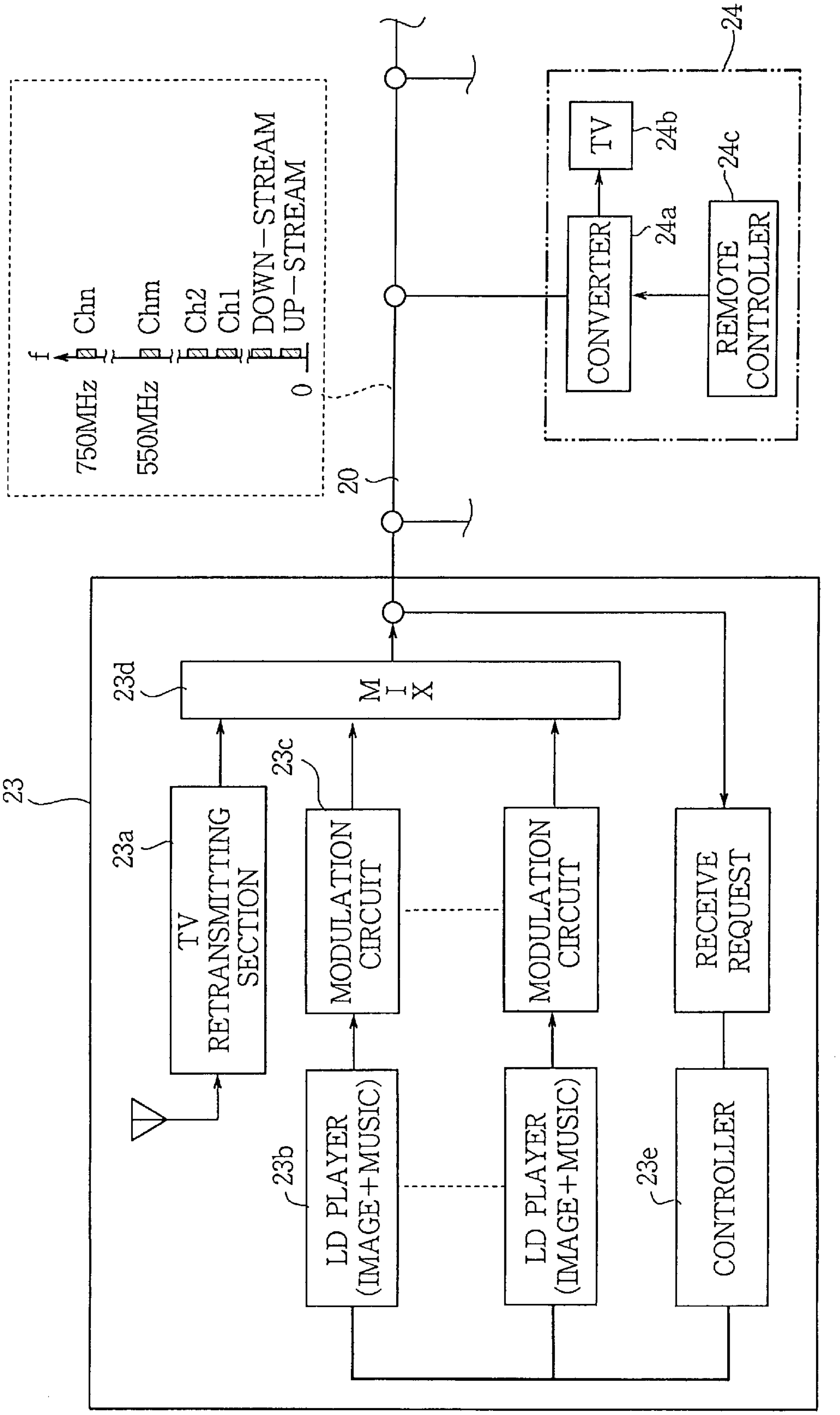
FIG.8 PRIOR ART
FIG. 8 is a block diagram showing a further conventional sing-along data transmitting/receiving system using a two-way CATV system.

FIG. 5 shows a second embodiment of the present invention.

In the second embodiment shown in FIG. 5, a sing-along data center 300 has a transmitting section compatible with satellite communication. The center 300 transmits sing-along data to many sing-along data receiving terminals 401 by means of a communication satellite 200. Further, the sing-along data may be transmitted to terminals 402 located far away, first through the satellite 200 and then through a CATV relay station 301 and a CATV cable 202. In the drawing, a communication line 203 is provided to send customer's request to the center 300 via a host 201.

As can be understood from the above description, according to the present invention, since the background video data transmitting channels and the music data transmitting channels will not be unfavourably affected by the number of sing-along data receiving terminals, it is allowed to establish as many sing-along terminals as needed.

Further, since a sing-along data receiving terminal is allowed to dispense with any audio disc player and video disc player, the terminal can be made more compact than a conventional sing-along terminal. Therefore, such a sing-along data receiving terminal can be formed by its simple combination into an existing or new CATV system, with only a low cost as compared with a conventional sing-along terminal.

Moreover, with the use of the method and system according to the present invention, it is not necessary to maintain and manage many audio and video data in a sing-along terminal (which is unavoidable in a conventional system), thus simplifying the operation and management of the terminal.

In addition, with the use of the method and system according to the present invention, it is easy to add new melodies to those existing in a audio data server, thereby obtaining a greatly increased amount of music data as compared with a conventional sing-along system.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A sing-along data transmitting method, comprising:

providing a sing-along data center for supplying background video data and music data;

providing a plurality of sing-along data receiving terminals for receiving the background video data and music data fed from the sing-along data center;

continuously transmitting a plurality of background video data by way of a plurality of different channels without receiving a request from a specific data receiving terminal of said plurality of data receiving terminals;

transmitting music data of a plurality of melodies by way of at least one channel; and transmitting a channel data indicating a channel through which said background video data corresponding to a selected music is being transmitted, said channel data being transmitted together with music data;

wherein the music data contains music melody data and lyrics data, and wherein the music data is repeatedly transmitted.

2. The sing-along data transmitting method according to claim 1, wherein said music data are compressed so as to be transmitted in a sufficiently shortened time period less than real time.

3. A sing-along data transmitting/receiving system, comprising:

a sing-along data center for supplying background video data and music data;

a plurality of sing-along data receiving terminals for receiving the background video data and music data fed from the sing-along data center;

a data communication way for continuously transmitting the background video data and music data from the sing-along data center to the plurality of sing-along data receiving terminals;

wherein the sing-along data center comprises:

a video data supplying means for repeatedly reproducing a plurality of background video data;

a video data transmitting means for continuously transmitting the reproduced background video data by way of respective video data transmitting channels without a specific request from one data terminal of the plurality of data terminals;

a music data supplying means for repeatedly reproducing music data of a plurality of melodies;

a music data transmitting means for transmitting the reproduced music data by way of a predetermined music data transmitting channel;

wherein each of the sing-along data receiving terminals comprises:

an input means for designating a sing-along melody;

a music data receiving means for receiving the music data from the above predetermined music data transmitting channel; and wherein the system further comprises a channel data producing means for producing channel data indicating a channel through which background video data corresponding to a music is being transmitted, wherein each of the sing-along data receiving terminals further comprises a video data receiving means for receiving the video data from one of the above video data transmitting channels in accordance with the channel data transmitted together with the music data, wherein music data contains music melody data and lyrics data, and wherein the music data is repeatedly transmitted.

4. A sing-along data transmitting/receiving system according to claim 3, wherein the music data transmitting means is provided to transmit reproduced music data together with the produced respective channel data, and the music data receiving means is provided to extract music data of a sing-along melody designated by said input means and to extract channel data corresponding to the designated sing-along melody; and wherein the video data receiving means receives the video data from one of the video data transmitting channels, in accordance with the extracted channel data.

5. A sing-along data receiving system, adapted to receive background video data continuously transmitted through a plurality of video data transmitting channels without receiving a request from a specific data receiving terminal, to receive music data of a plurality of melodies by way of at least one music data transmitting channel, to receive a channel data indicating a channel through which said background video data corresponding to a selected music is being transmitted, said sing-along data receiving terminal comprises:

an input means for designating a sing-along melody;

a music data receiving means for selecting a music data transmitting channel to receive music data of a sing-along melody designated by the input means and channel data corresponding to the sing-along melody, so as to output the sing-along melody; and a video data receiving means for selecting one of the video data transmitting channels in accordance with channel data received by the above music data receiving means, so as to receive the background video data, thereby outputting the background image, wherein said channel data is transmitted together with said music data;

wherein said music data contains music melody data and lyrics data, and wherein the music data is repeatedly transmitted.

* * * * *